Jan. 19, 1960  C. VINTEN  2,921,511
CONTROL OF THE IRIS APERTURE SIZE IN PHOTOGRAPHIC CAMERAS
Filed April 2, 1954  3 Sheets-Sheet 1

INVENTOR:
Charles Vinten
BY
Cushman, Darby & Cushman
ATTORNEYS

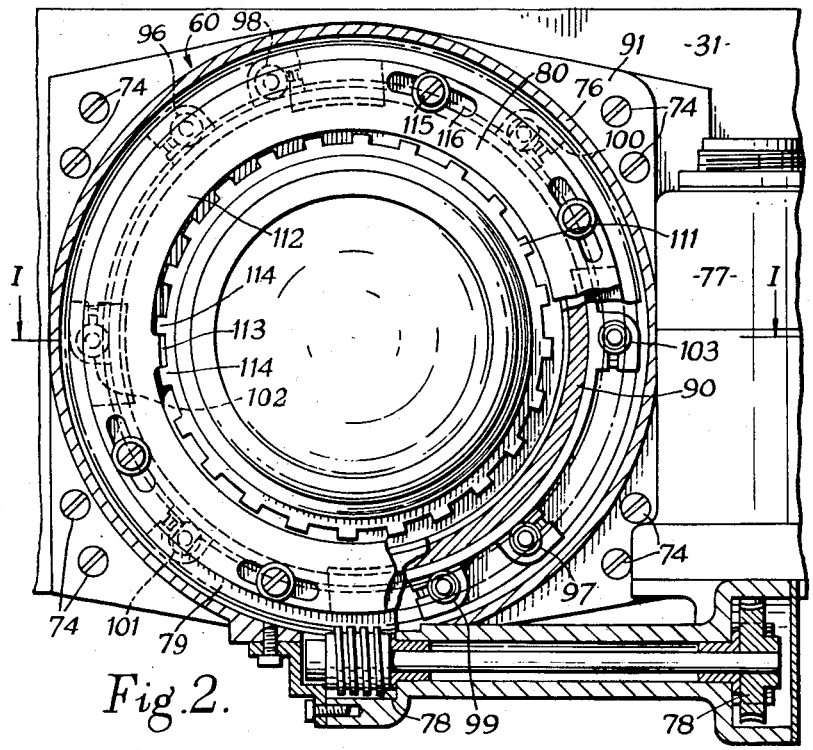
Fig.2.
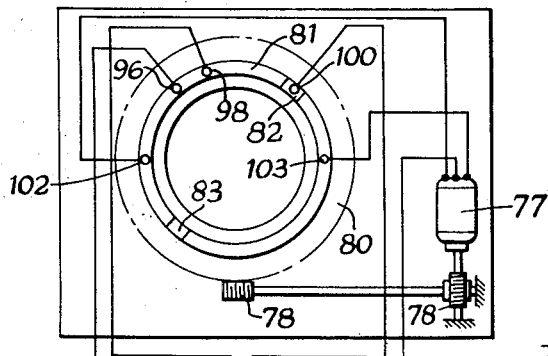
Fig.5.
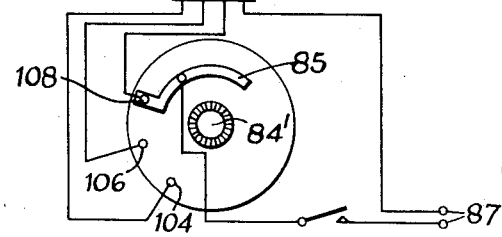

Jan. 19, 1960          C. VINTEN          2,921,511
CONTROL OF THE IRIS APERTURE SIZE IN PHOTOGRAPHIC CAMERAS
Filed April 2, 1954          3 Sheets-Sheet 3
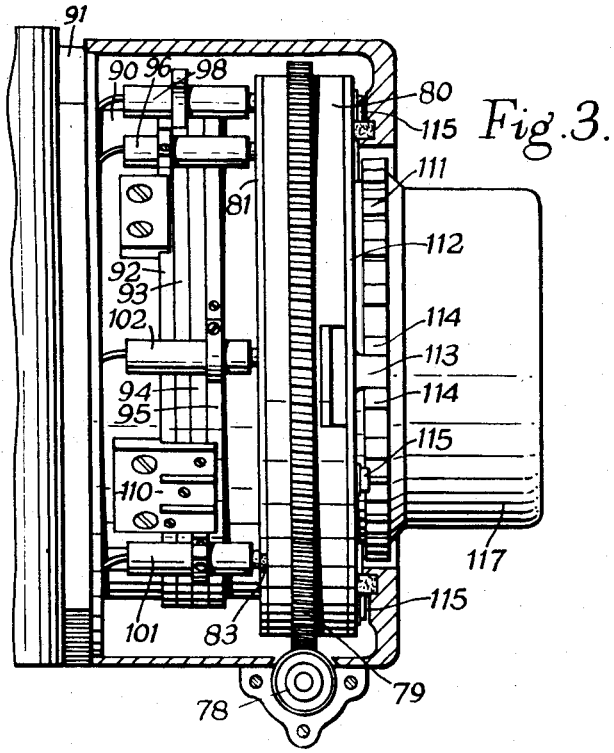
Fig. 3.
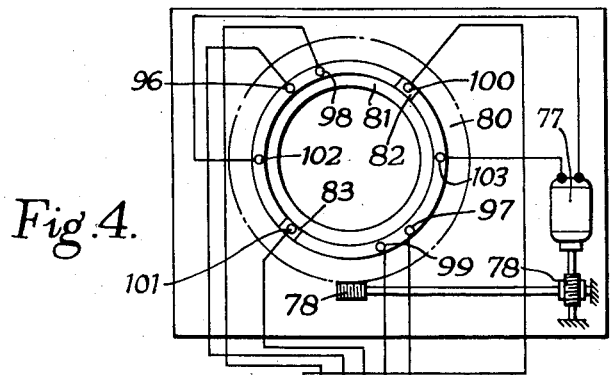
Fig. 4.
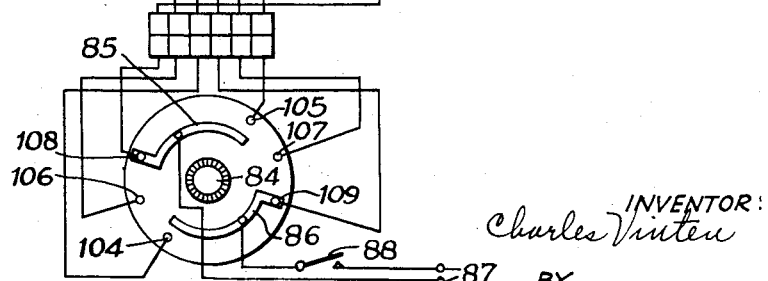
INVENTOR:
Charles Vinten
BY
Cushman, Darby & Cushman
ATTORNEYS

United States Patent Office 2,921,511
Patented Jan. 19, 1960

2,921,511

CONTROL OF THE IRIS APERTURE SIZE IN PHOTOGRAPHIC CAMERAS

Charles Vinten, London, England

Application April 2, 1954, Serial No. 420,662

Claims priority, application Great Britain April 28, 1953

8 Claims. (Cl. 95—64)

This invention relates to improvements in the control of the iris aperture size in photographic cameras, and has for its object to provide efficient and reliable means in a relatively small compass and of relatively small weight, whereby the operator of a camera may, from a remote position, alter the iris aperture size as may be necessary or desirable. As an example of circumstances in which such remote control of the iris aperture size of a camera is required, there is instanced the employment of a camera in aircraft in making an aerial survey and photographic record of a tract of ground, where it is required to take a sequence of photographs over a period of time of sufficiently long duration to include the possibility of weather and light changes of such magnitude that alteration of the iris aperture size is necessary for continuance of useful results from the camera, and where it is inconvenient or impracticable to adjust the iris aperture manually.

According to the present invention, means are provided which are operated or set in operation by the user of the camera at a distance from the camera body, whereby a positive drive is applied to a rotary member whereby the iris aperture is enlarged or diminished, such means being so constructed and arranged that movement of the iris to enlarge or diminish the aperture thereof is automatically terminated when the size of the aperture has reached one of a number of a predetermined sizes corresponding to the setting chosen by the operator at a distance from the camera.

By way of example, embodiments of the invention are illustrated in the accompanying drawings, in which:

Fig. 2 shows a front view of this assembly with portions of the casing removed to reveal the working parts;

Figure 3 shows a side elevation of such working parts, as seen from the left in Fig. 2; and Figure 4 shows a simplified schematic diagram of the electric circuit.

Figure 5 shows a diagram similar to Fig. 4 of a modified circuit.

Figure 1:
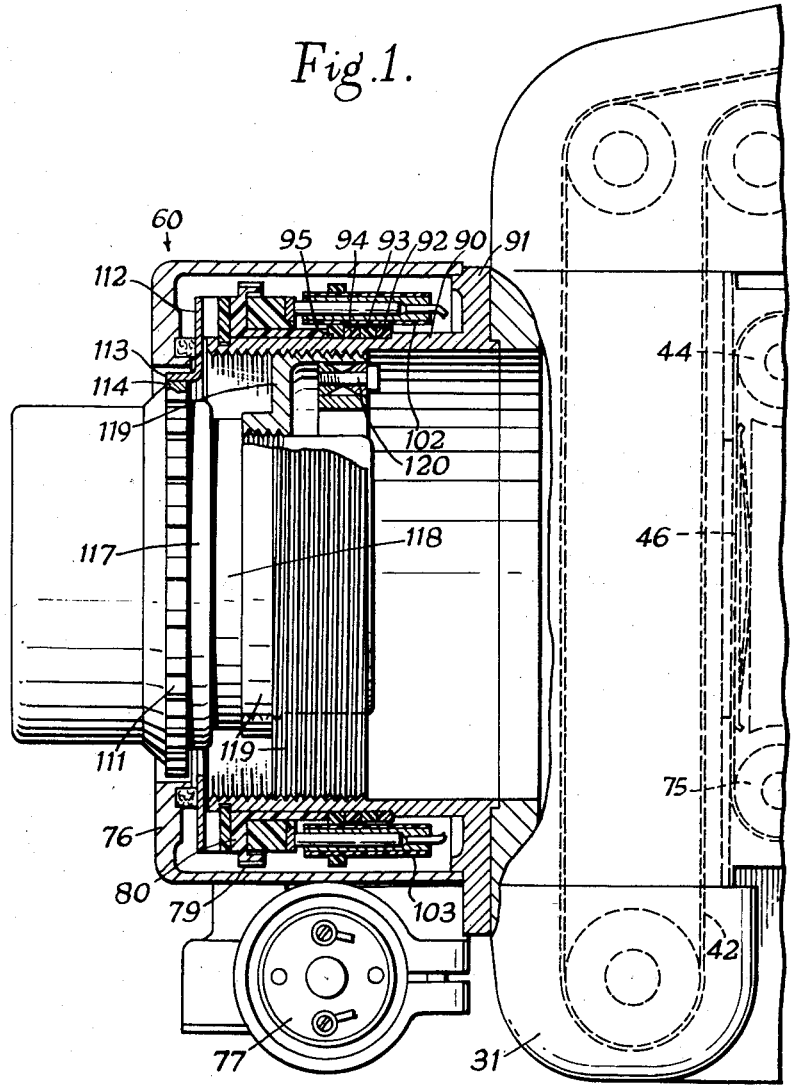
Figure 1 shows a side plan view (some parts being in section on the line I—I in Fig. 2) of an iris and lens assembly according to the invention, illustrating the relationship of such assembly to other parts of a camera.

The iris and lens assembly, designated generally as 60, is adapted for mounting, as by screws 74 (Fig. 2), on the chassis 31 of a camera. Fragments of the camera with which it is preferred to employ the assembly 60, are shown diagrammatically in Fig. 1, such camera including an endless band 42 acting as a shutter mechanism and spools 44 and 75 over which a sensitive film 46 passes intermittently to be positioned for exposure of successive frames. Details of the shutter mechanism and the film drive mechanism that it is preferred to employ in the camera, are given respectively in copending United States applications Serial No. 420,663 and Serial No. 420,661, now U.S. Patent No. 2,849,914. The present invention is concerned solely with the iris and lens assembly and its ancillary parts.

Attached to the outer casing 76 of the assembly 60 is a small electric motor 77, which drives through two stages of worm reduction gearing 78 to a toothed ring 79 on an iris ring 80. A commutating ring 81 is secured to the iris ring 80 so as to rotate therewith, such commutating ring 81 being divided into two electrically separate semicircles by insulating inserts 82 and 83.

On a fixed tubular portion 90 extending forwardly from a lens cone 91 secured to the camera chassis by the screws 74 and in turn supporting the outer casing 76, there are rotatably mounted four rings 92, 93, 94 and 95 each bearing a pair of diametrically opposite brush-holders 96, 97; 98, 99; 100, 101; and 102, 103, respectively, the brushes of these holders all bearing against the surface of the commutating ring 81 at various points around its periphery.

Current-carrying leads extend from the brush-holders 102, 103 (motor control brush holders) to the motor terminals (see Fig. 4), and each of the remaining aperture selection brush holders 96 to 101 is connected by a lead to a contact 104 to 109 respectively, forming part of a switch 84 arranged at a remote position and having movable segments 85 and 86 continuously connected to a source of direct current 87 through a main switch 88. The rings 92, 93 and 94 carrying the aperture selection brushes may be preset to desired positions relatively to each other and to the motor control brushes by rotation of such rings on the fixed cylindrical portion 90, means being provided such as a stop clamp 110 for securing the said rings 92–94 against movement relatively to each other or to the fixed portion 90 on which they are mounted, after the desired adjustment has been effected.

In considering the operation of the control apparatus above described, it will be assumed that initially the camera has been set in motion by the operator to take a series of photographs automatically with the largest possible size of iris aperture, i.e. the aperture size corresponding to the position of the iris ring 80 shown in the drawings (with the brushes of aperture selection brush-holders 100 and 101 engaging the insulating inserts 82 and 83), and that the light conditions having changed the operator now desires to diminish the size of the iris aperture. For this purpose the operator moves the switch 84 to close one of the motor energising circuits through a selected brush carrying ring, e.g. anticlockwise to connect the segments 85 and 86 to the contacts 106 and 107 respectively and thus supply power to the motor through the brushes of brush-holders 98, 102 and 99, 103 with the intermediary of the respective halves of the ring 81. The motor is thereby set in motion, the iris ring 80 is rotated by the gearing 78 and the iris is moved towards a smaller opening. This rotation is anticlockwise as viewed in Figs. 2 and 4. When the contact ring 81 fast to the iris ring 80 reaches a position where insulating inserts 82 and 83 therein come into register with the brushes of the brush-holders 98 and 99, the motor is deenergised and the iris remains in the new position (i.e. of intermediate aperture size) until the operator again energises the motor. This he may do either by moving the switch 84 further anticlockwise to connect segments 85 and 86 to contacts 104 and 105 and thus feeding power of the same polarity as previously to the motor through the brushes of brush-holders 96, 102 and 97, 103; or by turning the switch back in a clockwise direction to reconnect segments 85 and 86 to the contacts 108 and 109 and thus feed power of the opposite polarity to the motor through the brushes of brush-holders 100, 103 and 101, 102. In the former instance the iris ring 80 will be rotated anticlockwise so as further to reduce the aperture size until the inserts 82 and 83 register with the brushes of brush-holders 96 and 97, respectively; and in the latter case the iris ring 80 will be reversed so as to increase the aperture size to that initially obtaining.

The iris ring 80 will thus, in effect, follow up any movement given to the switch 84. As previously explained the dispositions of the pairs of brush-holders may be predetermined as found convenient, those chosen in the illustrated example corresponding to aperture sizes of f2 (the position shown); f4 (with the inserts 82 and 83 engaging the brushes of brush-holders 98, 99); and f8 (with the inserts 82 and 83 engaging the brushes of brushholders 96, 97).

Details of the iris aperture mechanism are not shown, but it will of course be understood that these are of conventional form and are housed within an iris index ring 111 connected to the iris ring 80 by a disc 112, a finger 113 on said disc engaging between a pair of teeth 114 on such index ring 111. The disc 112 is adjustable within limits relatively to the iris ring 80 by means of screws 115 and slots 116. The lens assembly 117 is rotatably mounted on a stem portion 118 which is screwed into a lens sleeve 119 having an external screw thread which in turn engages a corresponding thread on the interior of the cylindrical portion 90 of the lens cone 91. After the lens has been correctly focussed, a lens sleeve clamp 120 is tightened to secure the parts firmly in position.

Figure 5 shows a modified circuit in which one pole of the power source is taken directly to a mid point on the motor, the other pole passing through a modified switch 84' and the commutating ring 81 against which only the brushes of brush-holders 96, 98, 100, 102 and 103 bear. The brushes of brush-holders 102 and 103 are connected to end points on the motor winding, so that, with the mid point energised with one polarity, the direction in which the motor turns will depend upon which of the brushes of brush-holders 102 and 103 is connected to the other polarity, these connections taking place in the same manner as previously described with reference to Fig. 4 through the intermediary of the switch 84' which is the same as the switch 84 except that it requires only the segment 85.

It should be explained that the systems shown in Figs. 4 and 5 are simplified for the purposes of illustration, and that in practice it will normally be preferred to employ more than one camera and to control all the cameras simultaneously through a common switch, the parts shown being repeated as often as required and suitably ganged together. When more than one camera is employed, selector switches will also preferably be included in the circuit whereby the cameras in use may be chosen by the operator. In aerial photography, the primary purpose for which the camera has been designed, it is generally expedient to employ three cameras, the central one being directed vertically downwardly, and the port and starboard ones being slightly outwardly as well as downwardly directed.

It will be apparent that the stationary and moving parts of the apparatus above described may be reversed, i.e. the commutating ring being stationary and the brushes being mounted to rotate with the iris mechanism.

I claim:

1. An iris diaphragm electric control system for use in a cinematographic camera fitted to an aircraft, comprising an iris mechanism for varying the aperture size, a reversible electric motor for moving such iris mechanism, a series of aperture selection brushes arranged in spaced relationship and each corresponding to a desired aperture size, a pair of motor control brushes in spaced relationship to said series and each connected to a motor terminal, a commutating member arranged so as always to establish connections between a motor control brush and the aperture selection brushes corresponding to aperture sizes other than that momentarily occupied by the iris mechanism, and switch means arranged at a position remote from the iris mechanism and adapted to connect a source of electrical energy selectively to any one of said aperture selection brushes, one of a pair of sets of parts consisting of the motor control and aperture selection brushes on the one hand and the commutating member on the other hand being normally stationary and the other such set being connected to the iris mechanism to move therewith.

2. An iris diaphragm electric control system, comprising an iris mechanism for varying the aperture size, a reversible electric motor for moving such iris mechanism, a series of normally stationary aperture selection brushes arranged circumferentially around the iris mechanism in spaced relationship corresponding to the positions of a point on the circumference of the iris mechanism for each desired aperture size, a pair of normally stationary motor control brushes each connected to a motor terminal and arranged at respective ends of said series, a commutating member associated with said brushes and connected to the iris mechanism to move therewith, and switch means arranged at a position remote from the iris mechanism and adapted to connect a source of electrical energy selectively to any one of said aperture selection brushes, said commutating member being arranged so as always to establish connections between a motor contact and the iris contacts corresponding to aperture sizes other than that momentarily occupied by the iris mechanism.

3. An iris diaphragm electric control system as defined in claim 2, wherein said commutating member comprises a circumferentially extending electrically conducting arcuate member secured to the iris mechanism and divided into two electrically separate portions by a pair of insulating segments, the aperture selection and motor control brushes being circumferentially disposed so as to make contact with such rings.

4. An iris diaphragm electric control system, comprising an iris mechanism for varying the aperture size; a reversible electric motor for moving such iris mechanism; a commutating ring divided into two electrically separate portions, such ring being secured to the iris mechanism to move therewith; pairs of diametrically opposite normally stationary aperture selection brushes disposed around the circumference of the iris mechanism, respective brushes of said pairs being in contact with the respective portions of said ring and in spaced relationship corresponding to the positions of a point on the circumference of the iris mechanism for each desired aperture size; a pair of normally stationary motor control brushes connected to motor terminals and arranged beyond one extremity of the series of said pairs of aperture selection brushes and also each in contact with a portion of said ring; and switch means arranged at a position remote from the iris mechanism and adapted to connect a source of direct current selectively across any one pair of said aperture selection contacts.

5. An iris diaphragm electric control system, comprising an iris mechanism for varying the aperture size; a reversible electric motor for moving such iris mechanism; a commutating ring divided into two electrically separate portions, such ring being secured to the iris mechanism to move therewith; a series of normally stationary aperture selection brushes disposed around the circumference of the iris mechanism in contact with said ring and in spaced relationship corresponding to the positions of a point on the circumference of the iris mechanism for each desired aperture size; two normally stationary motor control brushes arranged in contact with respective portions of said ring one at each end of the series of aperture selection brushes, said motor control brushes being connected to end points of the motor winding, an intermediate point on which winding is connected to one polarity of a source of direct current; and switch means arranged at a position remote from the iris mechanism and adapted to connect the other polarity of said source selectively to any one of said aperture selection brushes.

6. In a cinematographic camera fitted for use in aircraft and having an iris diaphragm mechanism for varying the size of an aperture and a reversible electric motor for moving said iris mechanism, an electric control system comprising inlet terminals connected to a multiposition switch, terminals in said switch connected respectively to a series of aperture selection brushes, said aperture selection brushes in electrical contact with a segment of a commutator member, and at predetermined spaced positions on said commutator member, motor control brushes in electrical contact with said commutator member and connected by leads to energizing poles of said reversible electric motor, each position of said switch closing a circuit between said poles of said reversible electric motor, said aperture selection brushes, a segment of said commutator member and said electrical inlets, the energizing of said motor rotating said commutator member through mechanical connection therewith to a position where the aperture selection brush in said closed circuit comes in contact with an insulating separator of said commutator member, thereby breaking the circuit.

7. The electrical control system of claim 6 wherein said segments of said commutator member comprise circumferentially extending electrically conducting arcuate elements secured to said iris mechanism and divided into electrically separate portions by a pair of insulating members, the aperture selection and motor control brushes being circumferentially disposed in electric contact with such arcuate segment.

8. The electrical control system of claim 7 wherein at a stationary position of said commutator member, one of said aperture selection brushes will be in contact with one of said insulating members.

References Cited in the file of this patent

UNITED STATES PATENTS

| | | |
|---|---|---|
| 2,393,407 | Peterson | Jan. 22, 1946 |
| 2,393,408 | Peterson | Jan. 22, 1946 |
| 2,406,550 | Long | Aug. 27, 1946 |
| 2,599,048 | Dicke | June 3, 1952 |
| 2,694,352 | Babbs | Nov. 16, 1954 |
| 2,717,544 | Messenger et al. | Sept. 13, 1955 |
| 2,755,425 | Reid | July 17, 1956 |
| 2,815,478 | Kuller | Dec. 3, 1957 |

FOREIGN PATENTS

| | | |
|---|---|---|
| 125,512 | Australia | Oct. 2, 1947 |